May 10, 1949.     J. L. HILTON     2,470,071
AXLE BOX
Filed Dec. 8, 1945

INVENTOR.
John Leslie Hilton
BY C. P. Goepel
his ATTORNEY

Patented May 10, 1949

2,470,071

UNITED STATES PATENT OFFICE 2,470,071

AXLE BOX

John Leslie Hilton, Chelmsford, England, assignor to Norma-Hoffmann Bearings Corporation, Stamford, Conn.

Application December 8, 1945, Serial No. 633,664
In Great Britain May 7, 1945

1 Claim. (Cl. 308—180)

The present invention relates to an axle box of the kind which is supported on one or more roller bearings and a ball bearing is provided for end location and to deal with any thrust load which may arise.

In axle boxes of this kind as at present constructed the ball bearing is an individual component which is manufactured separately from the roller bearing, and the arrangement suffers from the disadvantage that the ball bearing must be mounted: Either (a) on the axle end, in which case it must be removed before the parts of the roller bearings not rigidly secured to the axle can be withdrawn during dismounting, or (b) at a position on the axle where the stress is relatively high with consequent risk of damage to the axle as a result of fret corrosion or scoring between the inner race of the ball bearing and the axle.

A further disadvantage in known arrangements is that the inner races of the ball and roller bearings are frequently not clamped in an endways manner, and are secured on the axle only by interference between the bore of the inner race of the roller bearing and the axle, and on account of this the inner race of the ball bearing is liable to creep.

This invention is designed to overcome these drawbacks, and is applicable to axle bores arranged either externally or internally of the wheel. In an axle box according to the invention there are one or more rows of cylindrical rollers and one row of balls, the inner tracks or raceways of which form part of a single common inner race.

The ball bearing may be arranged at one end of the inner race or in between two rows of rollers, and in the first case it is preferable to relieve the bore of the inner race, e. g., by chamfering or recessing the inner race, so that there is no contact between this part and the axle. The outer race of the ball bearing is divided circumferentially so that when the two halves are displaced axially the balls and cage can be readily withdrawn from the inner race, and it is an advantage to allow sufficient radial freedom in the ball pockets of the cage to permit the balls to pass over the inner race, but to retain them within the cage so that the cage and balls can be handled as a unit.

With this construction all parts can be readily removed from the axle, with the exception of the common inner race. This is pressed or shrunk into position on the axle and all danger of damage at the point of relatively high stress is thereby avoided.

Figure 1:
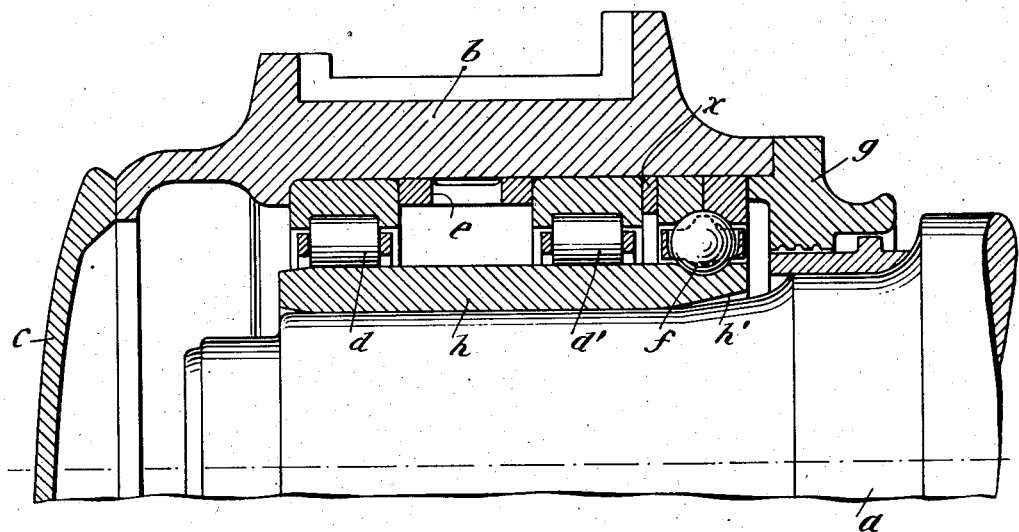
Figure 2:
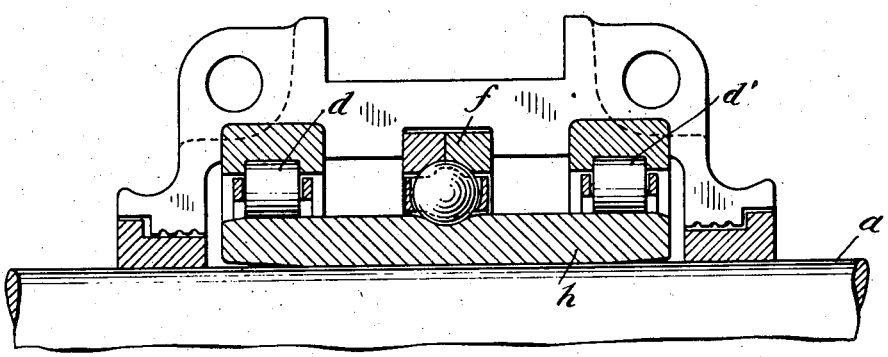

Two forms of construction of the invention are illustrated in sectional elevation in Figures 1 and 2 respectively on the annexed drawings. Fig. 1 shows an axle box arranged outside the wheel, and Fig. 2 an axle box arranged inside the wheel.

Referring first to Figure 1, $a$ is an axle mounted in an axle box which comprises a casing $b$ with an outer end cover $c$ and an inner end cover $g$. Within the casing are mounted the inner races for two rows of rollers $d$ and $d'$ which are separated by a distance piece $e$. The casing also contains the outer race of a ball bearing $f$ divided circumferentially into two parts as shown, and arranged at the inner end of the axle box, one half of the ball bearing outer race abutting against the inner end cover $g$ and the other against a distance piece $x$ which is inserted between this race and the outer race of the roller bearing $d'$. A single common inner race $h$ is provided with running tracks or raceways for all three rows of rolling elements, and the inner end of its bore is chamfered as shown at $h'$ so that there is no contact between this part of the inner race and the part of the axle under the balls.

In the modified arrangement shown in Fig. 2 the balls are arranged between two rows of rollers, and with this arrangement the bore of the inner race $h$ is not made clear of the part of the axle under the balls.

I claim:

In an axle box having a casing with a bore and a shaft concentrically spaced from said bore, and having a roller bearing with its outer race ring held by the wall of said bore and having rollers, the combination of a ball bearing outer race ring circumferentially divided into two parts, held by said wall of said bore, with one part adjacent the roller bearing, a cage for the balls of the ball bearing having ball retaining pockets of a ball enclosing contour to allow radial displacement of the balls, an inner race sleeve secured to the axle having the same outer diameter throughout with a ball race groove of smaller diameter at one end for said balls, forming a common sleeve for said balls and said rollers, and a closure member for the casing at said sleeve end and adjacent one of said outer race ring parts, whereby, upon removal of the closure member from the casing and relative axial movement of the casing and sleeve, and with the outer race ring parts axially separated, the radial displacement of the balls in the cage and their removal from the smaller diameter race groove to the larger diameter of the common sleeve enables the cage retained balls and the rollers to slide along the sleeve, without removing the sleeve from the axle.

JOHN LESLIE HILTON.

REFERENCES CITED

The following references are of record in the file of this patent:

UNITED STATES PATENTS

| Number | Name | Date |
|---|---|---|
| 896,877 | Witte | Aug. 25, 1908 |
| 1,340,663 | Maire | May 18, 1920 |
| 1,638,957 | Pitt | Aug. 16, 1927 |
| 1,765,705 | Smith | June 24, 1930 |
| 2,035,160 | Herold | Mar. 24, 1936 |

FOREIGN PATENTS

| Number | Country | Date |
|---|---|---|
| 435,364 | France | Feb. 28, 1912 |